(12) United States Patent
Sharpless

(10) Patent No.: US 9,687,908 B2
(45) Date of Patent: Jun. 27, 2017

(54) METHOD OF CASTING INTERNAL FEATURES

(71) Applicant: Lam Research Corporation, Fremont, CA (US)

(72) Inventor: Leonard Sharpless, Fremont, CA (US)

(73) Assignee: Law Research Corporation, Fremont, CA (US)

( * ) Notice: Subject to any disclaimer, the term of this patent is extended or adjusted under 35 U.S.C. 154(b) by 0 days.

(21) Appl. No.: 14/845,187

(22) Filed: Sep. 3, 2015

(65) Prior Publication Data

US 2017/0066045 A1   Mar. 9, 2017

(51) Int. Cl.
| | |
|---|---|
| *B22C 9/24* | (2006.01) |
| *B22C 9/10* | (2006.01) |
| *B22C 1/18* | (2006.01) |
| *B22D 25/02* | (2006.01) |
| *B22D 21/04* | (2006.01) |
| *B33Y 10/00* | (2015.01) |

(52) U.S. Cl.
CPC .............. *B22C 9/24* (2013.01); *B22C 1/18* (2013.01); *B22C 9/105* (2013.01); *B22D 21/04* (2013.01); *B22D 25/02* (2013.01); *B33Y 10/00* (2014.12)

(58) Field of Classification Search
CPC .. B22C 9/00; B22C 9/10; B22C 9/105; B22C 9/24; B22C 1/18; B22D 25/02; B22D 21/04
See application file for complete search history.

(56) References Cited

U.S. PATENT DOCUMENTS

| | | |
|---|---|---|
| 5,787,958 A | 8/1998 | Shivkumar et al. |
| 2005/0087323 A1 | 4/2005 | Hathaway |
| 2012/0048502 A1 | 3/2012 | Anzai et al. |

*Primary Examiner* — Kevin P Kerns
*Assistant Examiner* — Steven Ha
(74) *Attorney, Agent, or Firm* — Beyer Law Group LLP

(57) ABSTRACT

A method for casting an internal feature within an object is provided. An internal mold is formed from a mold powder, comprising a base powder and an acid powder mixed into the base powder. A molten material is cast around the internal mold. The molten material is solidified. The internal mold is reacted with water, wherein the reacting causes the acid powder to neutralize the base powder.

16 Claims, 5 Drawing Sheets

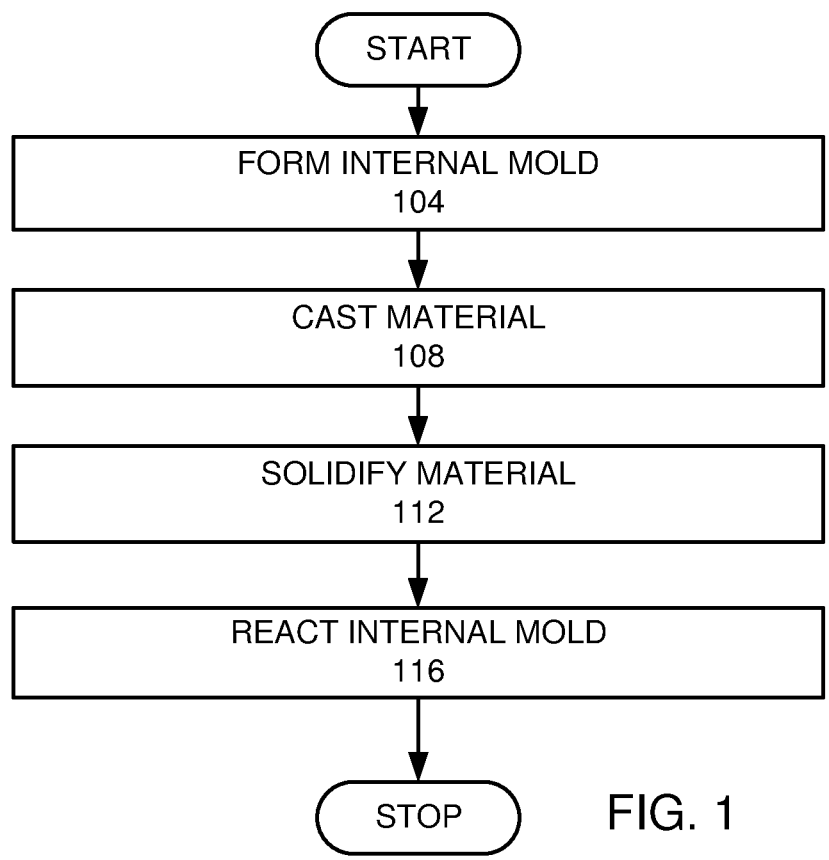

METHOD OF CASTING INTERNAL FEATURES

BACKGROUND

The present disclosure relates to the internal features. More specifically, the disclosure relates to the formation of internal features using casting.

During the casting of internal features a molten substance is cast around a mold. The mold is then removed.

This background is not an admission of prior art.

SUMMARY

To achieve the foregoing and in accordance with the purpose of the present disclosure, a method for casting an internal feature within an object is provided. An internal mold is formed from a mold powder, comprising a base powder and an acid powder mixed into the base powder. A molten material is cast around the internal mold. The molten material is solidified. The internal mold is reacted with water, wherein the reacting causes the acid powder to neutralize the base powder.

In another manifestation, a method for casting an internal feature within an object is provided. An internal mold from a mold powder is formed consisting essentially of an inorganic base powder and an inorganic acid powder mixed into the base powder. A molten material is cast around the internal mold. The molten material is solidified. The internal mold is reacted with water at a temperature of at least 20° C., wherein the reacting causes the acid powder to neutralize the base powder.

These and other features will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a high level flow chart of a process that may be used in an embodiment.

DETAILED DESCRIPTION

The present disclosure will now be described in detail with reference to a few preferred embodiments thereof as illustrated in the accompanying drawings. In the following description, numerous specific details are set forth in order to provide a thorough understanding of the present disclosure. It will be apparent, however, to one skilled in the art, that the present disclosure may be practiced without some or all of these specific details. In other instances, well known process steps and/or structures have not been described in detail in order to not unnecessarily obscure the present disclosure.

To facilitate understanding, FIG. 1 is a high level flow chart of an embodiment. An internal mold is formed from a mold powder, comprising a base powder and an acid powder (step 104). A molten material is cast around the internal mold (step 108). The molten material is solidified (step 112). The internal mold is reacted with water, which causes the acid powder to neutralize the base powder (step 116).

EXAMPLE

Figure 2A:
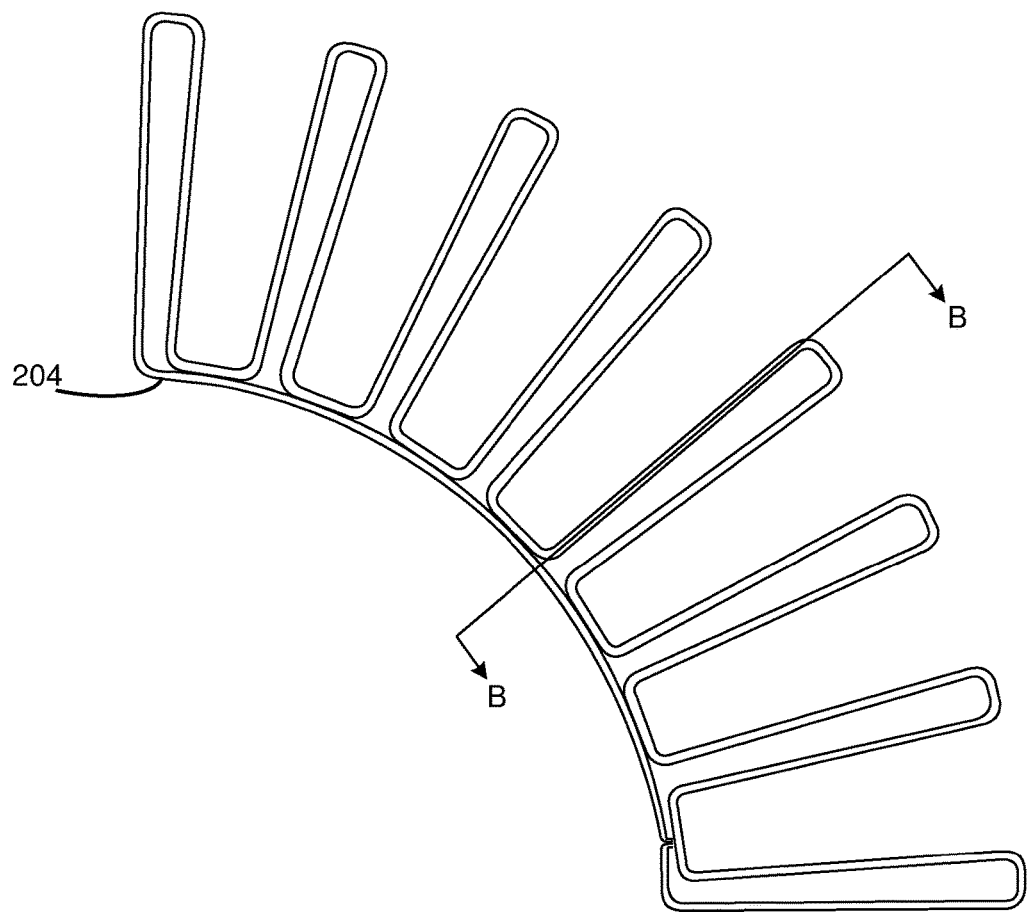
FIG. 2A is a top view of an internal mold formed by the mold powder that has been pressed into the shape of the internal mold.
Figure 2B:
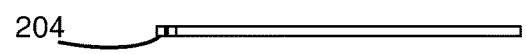
FIG. 2B is a cross-sectional view of the internal mold of FIG. 2A along cut lines B-B.

In an example of an implementation of the invention, an internal mold is formed from a mold powder, comprising a base powder and an acid powder (step 104). In this example, the mold powder consists essentially of sodium bicarbonate ($NaHCO_3$) powder and boric acid powder ($H_3BO_3$). In this embodiment the mold powder is pressed into the desired shape, using an isostatic press. An isostatic press is used to press ceramic powders into a shape. FIG. 2A is a top view of an internal mold 204 formed by the mold powder that has been pressed into the shape of the internal mold. FIG. 2B is a cross-sectional view of the internal mold 204 of FIG. 2A along cut lines B-B. It should be noted that the internal mold forms a long serpentine structure which is very thin in two-dimensions, which provides a very high aspect ratio, which is defined by the length divided by the thickness. In this example, the high aspect ratio is defined as being at least 20.

Figure 3A:
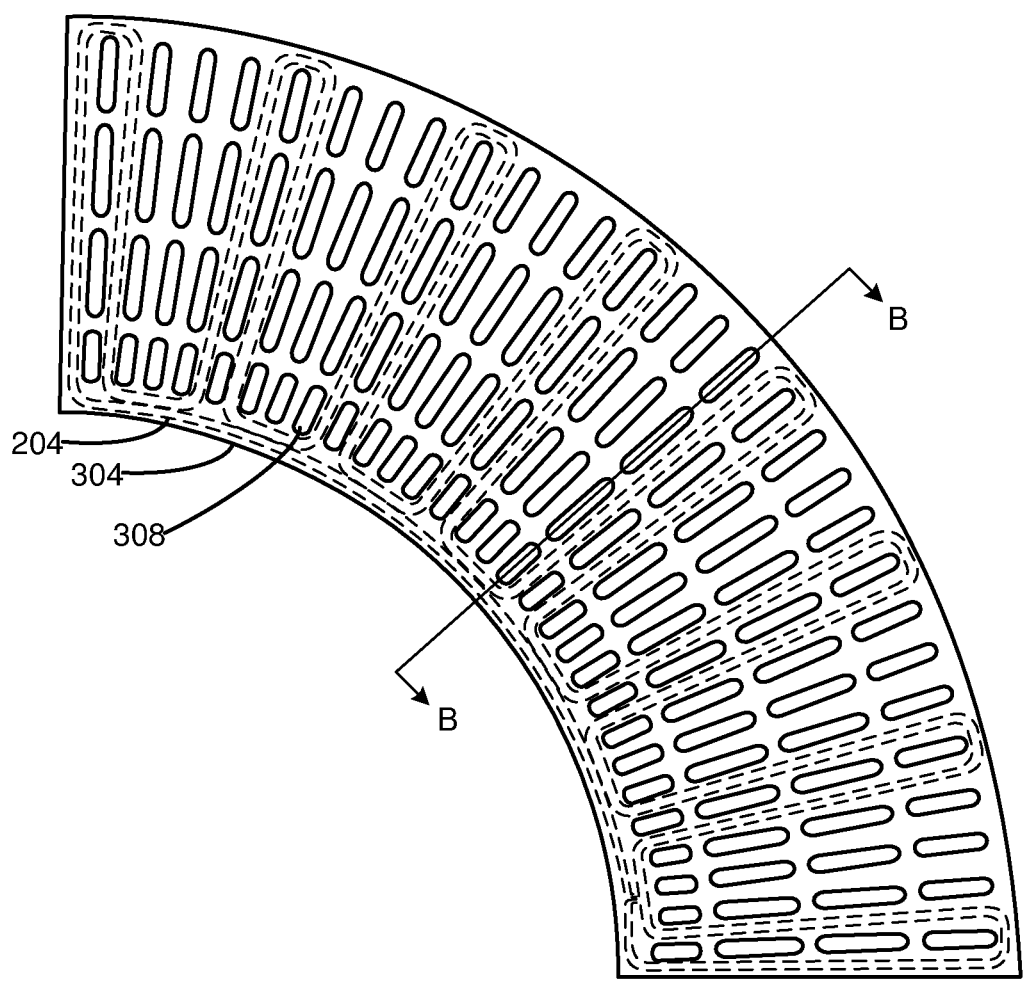
FIG. 3A is a top view of an object that is cast around the internal mold.
Figure 3B:
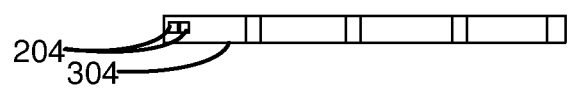
FIG. 3B is a cross-sectional view of the object of FIG. 3A along cut lines B-B.

A molten material is cast around the internal mold (step 108). In this example, the molten material is molten aluminum. The molten aluminum is solidified (step 112). FIG. 3A is a view of an object 304 that is cast around the internal mold 204. In this example, a conventional external mold is used to form the apertures 308 and exterior surface of the object 304. The internal mold 204 embedded within the object 304 is shown in dashed lines. FIG. 3B is a cross-sectional view of the object 304 of FIG. 3A along cut lines B-B. Part of the internal mold 204 is shown in FIG. 3B.

The internal mold is reacted with water, wherein the reacting causes acid powder to neutralize base powder (step 115). First, access is created from outside of the casting to the internal mold. This may be done by drilling a hole in the object to the internal mold. Water is then provided through the hole to the internal mold. The water turns the acid powder to an acid and the base powder to a base, where the acid and base completely or partially neutralize each other. In this example, since the acid is from a salt of $NaHCO_3$, the reaction creates carbon dioxide ($CO_2$) gas. The $CO_2$ gas helps to drive the reaction. Preferably, the water is provided at a temperature of at least 20° C. More preferably, the temperature of the water is between 60° to 90° C.

In this embodiment, the acid powder and base powder are inorganic, in that the acid powder and base powder do not have any carbon hydrogen bonds. This is preferable, since at high temperatures, related to molten casting, organic molecules are more likely to breakdown. Since the mold powder consists essentially of an acid powder and base powder, the acid powder and base powder neutralize each other so that at least half of the acid powder is neutralized by at least half of the base powder. Boric acid is an acid that is inorganic and may be formed into a powder. Sodium bicarbonate is a base that is inorganic and may be formed into a powder. Any remaining acid powder or base powder would dissolve in the water. Therefore, the mold self dissolves in water, so that the mold powder is completely soluble in water. Since the molds form long thin (high aspect ratio) and serpentine passages, there is a need for the mold to easily self dissolve in a small amount of water or water with a low flow rate. Therefore, the mold cannot just merely dissolve in water, but must be reactive with water to self dissolve in a small amount of water. The use of an acid powder and base powder provides a reaction with water, which creates water and energy to facilitate dissolving of all of the mold material in a small amount of water. This allows for the mold to be easily flushed from the high aspect ratio serpentine core. In the specification and claims, reacting the internal mold with water is more than dissolving the internal mold with water, but requires a chemical reaction, where the acid and base react with each other to form water. Preferably, the ratio of the acid powder to base powder is from 2:1 to 1:2, so that at least 50% of the acid and base are neutralized. More preferably, the ratio of the acid powder to base powder is from 4:3 to 3:4, so that at least 75% of the acid and base are neutralized. In the specification and claims the phrase the acid powder neutralizes the base powder means that at least half of the acid powder neutralizes at least half of the base powder.

The pressing helps to stabilize and densify the powder so that the mold will survive the casting.

Figure 4:
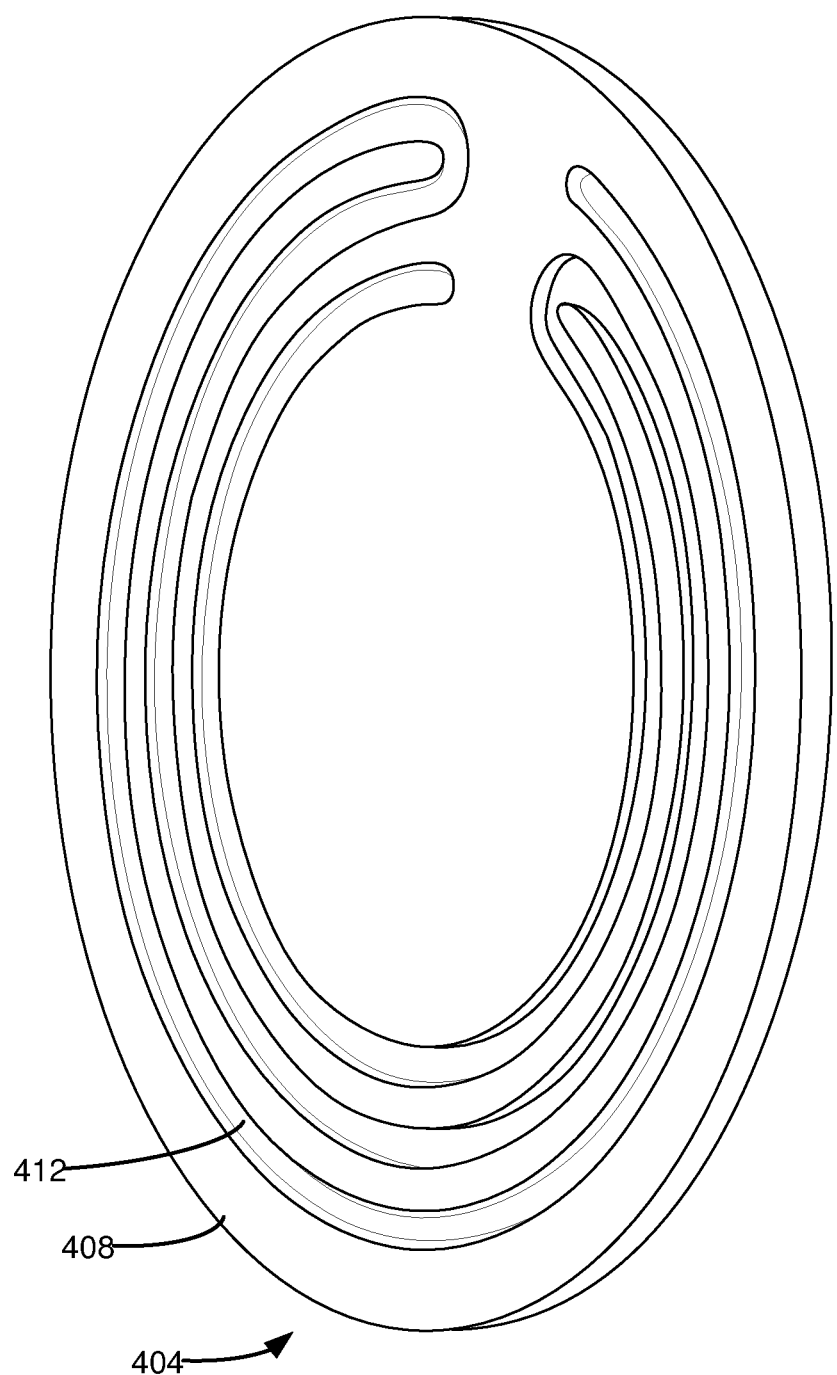
FIG. 4 is a perspective view of an aluminum backbone formed by an aluminum plate with a trench.
Figure 5:
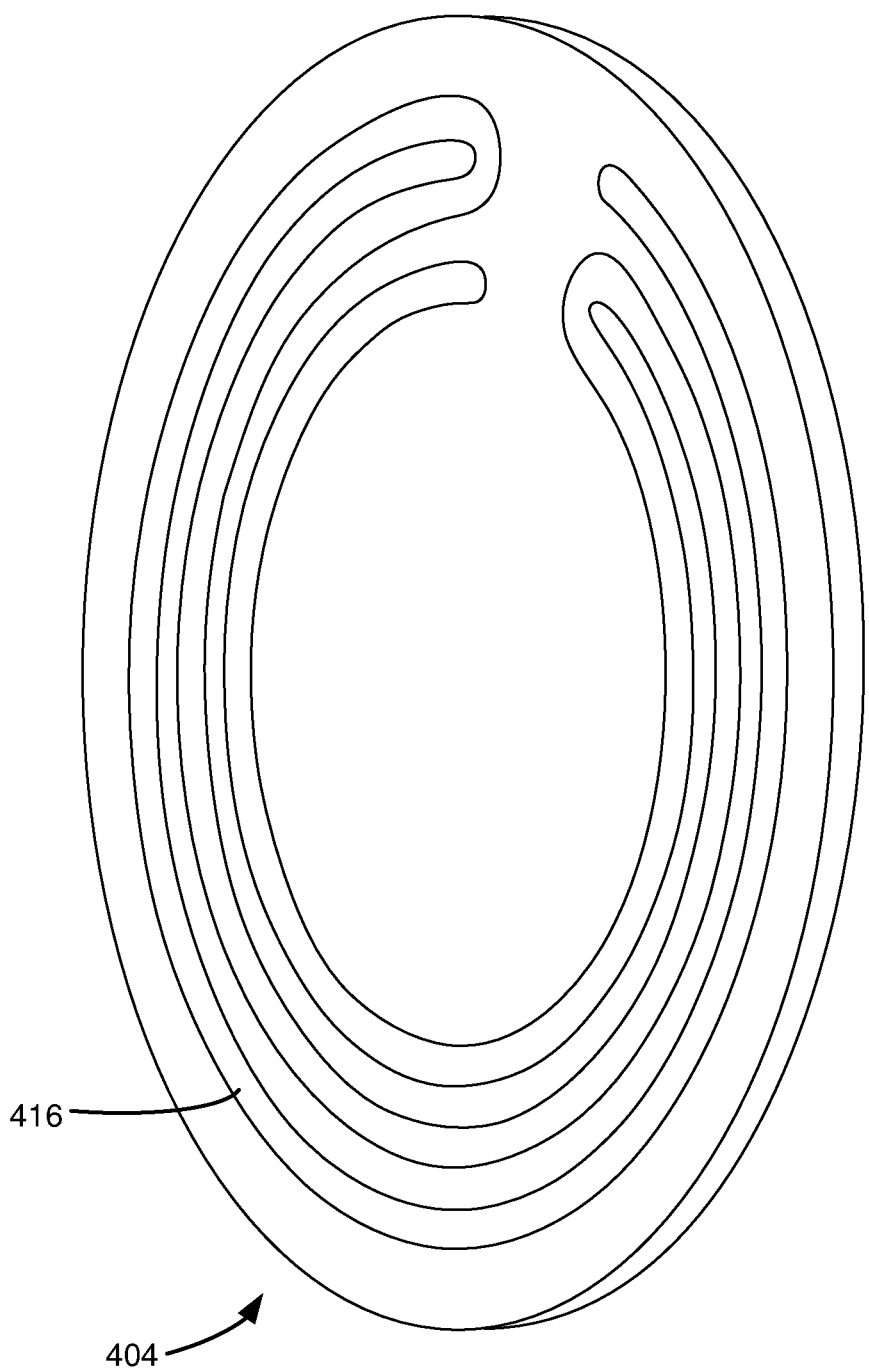
FIG. 5 is a perspective view of the aluminum backbone after mold powder has been pressed into the trench to form an internal mold.

In another embodiment, a backbone may be used to form the internal mold. FIG. 4 is a perspective view of an aluminum backbone 404 formed by an aluminum plate 408 with a trench 412. The backbone 404 may be formed in a more complex shape, such as having apertures. The aluminum backbone is premachined or formed. An internal mold is formed by pressing mold powder into the trench 412 (step 104). FIG. 5 is a perspective view of the aluminum backbone 404 after mold powder 416 has been pressed into the trench to form an internal mold. A molten material is cast around the internal mold and the aluminum backbone 404 (step 108). The molten material is solidified (step 112). The aluminum backbone may be suspended in an outer mold. A molten metal fills the outer mold and encapsulates the aluminum backbone and mold powder. In this example, the molten metal is molten aluminum. The aluminum backbone holds the mold powder in place during casting. The internal mold is reacted with water, which causes the acid powder to neutralize the base powder (step 116).

In other embodiments, the mold may be formed by 3D printing the mold powder into a mold shape. In another embodiment, the aluminum backbone may be in the form of an aluminum tube. A higher temperature metal may be cast around the filled aluminum tubes.

In one embodiment, the mold powder consists essentially of an acid powder and a base powder. The acid powder consists essentially of an acid salt, which is a salt that forms an acid when placed in water. The base powder consists essentially of a base salt, which is a salt that forms a base when placed in water. In an embodiment, the base powder is a bicarbonate salt. In another embodiment, the mold powder consists essentially of an acid powder, a base powder, and a binder. Preferably, the binder dissolves in water and is less than 5% of the mold powder by mass.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A method for casting an internal feature within an object, comprising:
    forming an internal mold from a mold powder, comprising:
        a base powder; and
        an acid powder mixed into the base powder;
    casting a molten material around the internal mold;
    solidifying the molten material; and
    reacting the internal mold with water, wherein the reacting causes the acid powder to neutralize the base powder.

2. The method, as recited in claim 1, wherein the acid powder and the base powder are inorganic, in that the acid powder and the base powder do not have any carbon hydrogen bonds.

3. The method, as recited in claim 2, wherein the base powder is a bicarbonate salt.

4. The method, as recited in claim 3, wherein the acid powder is boric acid.

5. The method, as recited in claim 4, wherein the base powder is sodium bicarbonate.

6. The method, as recited in claim 1, wherein the forming the internal mold comprises pressing the mold powder into a mold shape.

7. The method, as recited in claim 1, wherein the forming the internal mold comprises 3D printing the mold powder into a mold shape.

8. The method, as recited in claim 1, wherein the forming the internal mold comprises placing the powder in a backbone structure, and wherein the casting the molten material around the internal mold casts the molten material around the backbone structure.

9. The method, as recited in claim 8, wherein the backbone structure comprises aluminum and wherein the molten material comprises aluminum.

10. The method, as recited in claim 1, wherein the mold powder is completely soluble in water.

11. The method, as recited in claim 1, wherein the mold powder consists essentially of acid powder and base powder.

12. The method, as recited in claim 11, wherein the base powder is a bicarbonate salt.

13. The method, as recited in claim 12, wherein the acid powder is boric acid.

14. The method, as recited in claim 13, the ratio of the acid powder to base powder is from 2:1 to 1:2.

15. The method, as recited in claim 1, wherein the reacting the internal mold with water comprises reacting the internal mold with water at a temperature of at least 20° C.

16. A method for casting an internal feature within an object, comprising:
    forming an internal mold from a mold powder, consisting essentially of:
        an inorganic base powder; and
        an inorganic acid powder mixed into the base powder;
    casting a molten material around the internal mold;
    solidifying the molten material; and
    reacting the internal mold with water at a temperature of at least 20° C., wherein the reacting causes the acid powder to neutralize the base powder.

* * * * *

UNITED STATES PATENT AND TRADEMARK OFFICE
CERTIFICATE OF CORRECTION

PATENT NO. : 9,687,908 B2  
APPLICATION NO. : 14/845187  
DATED : June 27, 2017  
INVENTOR(S) : Leonard Sharpless Page 1 of 1

It is certified that error appears in the above-identified patent and that said Letters Patent is hereby corrected as shown below:

On the Title Page

1. Item (73) Assignee – change "Law Research Corporation" to --Lam Research Corporation--

Signed and Sealed this  
Fifteenth Day of May, 2018

Andrei Iancu  
*Director of the United States Patent and Trademark Office*